United States Patent
Newell et al.

(10) Patent No.: US 10,343,065 B2
(45) Date of Patent: Jul. 9, 2019

(54) MEDIA CONSUMER DATA EXCHANGE

(71) Applicant: EchoStar Technologies L.L.C., Englewood, CO (US)

(72) Inventors: Nicholas Brandon Newell, Centennial, CO (US); Omar A. Khan, Broomfield, CO (US)

(73) Assignee: DISH Technologies L.L.C., Englewood, CO (US)

(*) Notice: Subject to any disclaimer, the term of this patent is extended or adjusted under 35 U.S.C. 154(b) by 282 days.

(21) Appl. No.: 15/193,223

(22) Filed: Jun. 27, 2016

(65) Prior Publication Data
US 2017/0368456 A1    Dec. 28, 2017

(51) Int. Cl.
| | | |
|---|---|---|
| *A63F 13/46* | (2014.01) | |
| *A63F 13/87* | (2014.01) | |
| *G10L 15/18* | (2013.01) | |
| *G10L 25/63* | (2013.01) | |
| *A63F 13/795* | (2014.01) | |

(52) U.S. Cl.
CPC ............ *A63F 13/46* (2014.09); *A63F 13/795* (2014.09); *A63F 13/87* (2014.09); *G10L 25/63* (2013.01); *G10L 15/1822* (2013.01)

(58) Field of Classification Search
CPC ........ A63F 13/46; A63F 13/795; A63F 13/87; G10L 15/02; G10L 25/63
See application file for complete search history.

(56) References Cited

U.S. PATENT DOCUMENTS

| | | | | |
|---|---|---|---|---|
| 2008/0167121 A1* | 7/2008 | Maeda | ............... | A63F 13/12 463/30 |
| 2009/0318777 A1* | 12/2009 | Kameyama | .............. | A61B 5/16 600/301 |
| 2013/0039483 A1* | 2/2013 | Wolfeld | ................. | H04M 3/00 379/265.03 |
| 2015/0261389 A1* | 9/2015 | Abate | ................... | G06F 3/0481 715/741 |
| 2016/0019301 A1* | 1/2016 | Goldenstein | ...... | G06F 17/30867 707/722 |
| 2017/0302613 A1* | 10/2017 | Imbrie | ................... | H04L 51/32 |

OTHER PUBLICATIONS

U.S. Appl. No. 62/324,619, filed Apr. 19, 2016. (Year: 2016).*

* cited by examiner

*Primary Examiner* — Jay A Morrison
(74) *Attorney, Agent, or Firm* — Bejin Bieneman PLC (57) ABSTRACT

A computing device includes a processor is programmed to determine that communications from users relate to the same subject included in a stored list of subjects. Each of the communications includes an audio portion. The computing device is further programmed to determine a score for each of the communications based at least in part on one or more of tone data, speed data, duration data, and volume data extracted from the respective audio portion, and allow one of the users, based on a respective user score, to assign the subject to a group.

20 Claims, 8 Drawing Sheets

MEDIA CONSUMER DATA EXCHANGE

BACKGROUND

Media consumers such as the viewers of movies and TV programming may invest a substantial amount of time and energy following the lives and careers of media creators and/or participants. The consumers may have an interest in particular media creators/participants and enjoy sharing and comparing knowledge about the media creators/participants via data such video and/or audio recordings. A system is lacking to receive and compare user-submitted data related to media creators and/or participants.

DETAILED DESCRIPTION

Exemplary System

A network-based computer application receives and evaluates user input and allows users to select members to be included in a group assigned to the user based on the input. The groups are organized to compete in leagues. Group members typically include media content creators and/or participants, such as actors, directors, producers, writers and other TV programming or filmmakers. A computing device can receive data, e.g., video and/or audio recordings, providing a user description and/or commentary concerning one or more potential group members. A computing device evaluates and assigns scores to the received user-submitted data. A "score," in this context, is a number, e.g., on a scale of zero to one-hundred, representing an evaluation of various characteristics in the user data, e.g., a volume, tone, speed, etc. of user speech in user-submitted data. A high score can mean a higher level of user interest in a potential group member; a lower score can mean less user interest. Based on the scores, the computing device assigns a priority for one or more respective users to select a particular group member to their respective groups. For example, during a selection process, a user who has been granted a highest priority may "lock" the potential group member to the user's group. No other user in the user's league may select the potential group member.

Following group selection, groups compete based on success ratings of group members and associated media content items during a time period. A success rating can be determined based on collected data. A computing device collects data related to group members and media content associated with group members such collected data including, for example, movie and TV program ratings, box office sales, social media trend data, recognitions awarded to media content items or group members (Academy Awards, Golden Globes, etc.). Based on the collected data, the computing device assigns scores to each of the group members in each of the groups within each league. The computing device then determines total scores for each of the groups, and ranks the groups according to the scores.

System Description

Figure 1:
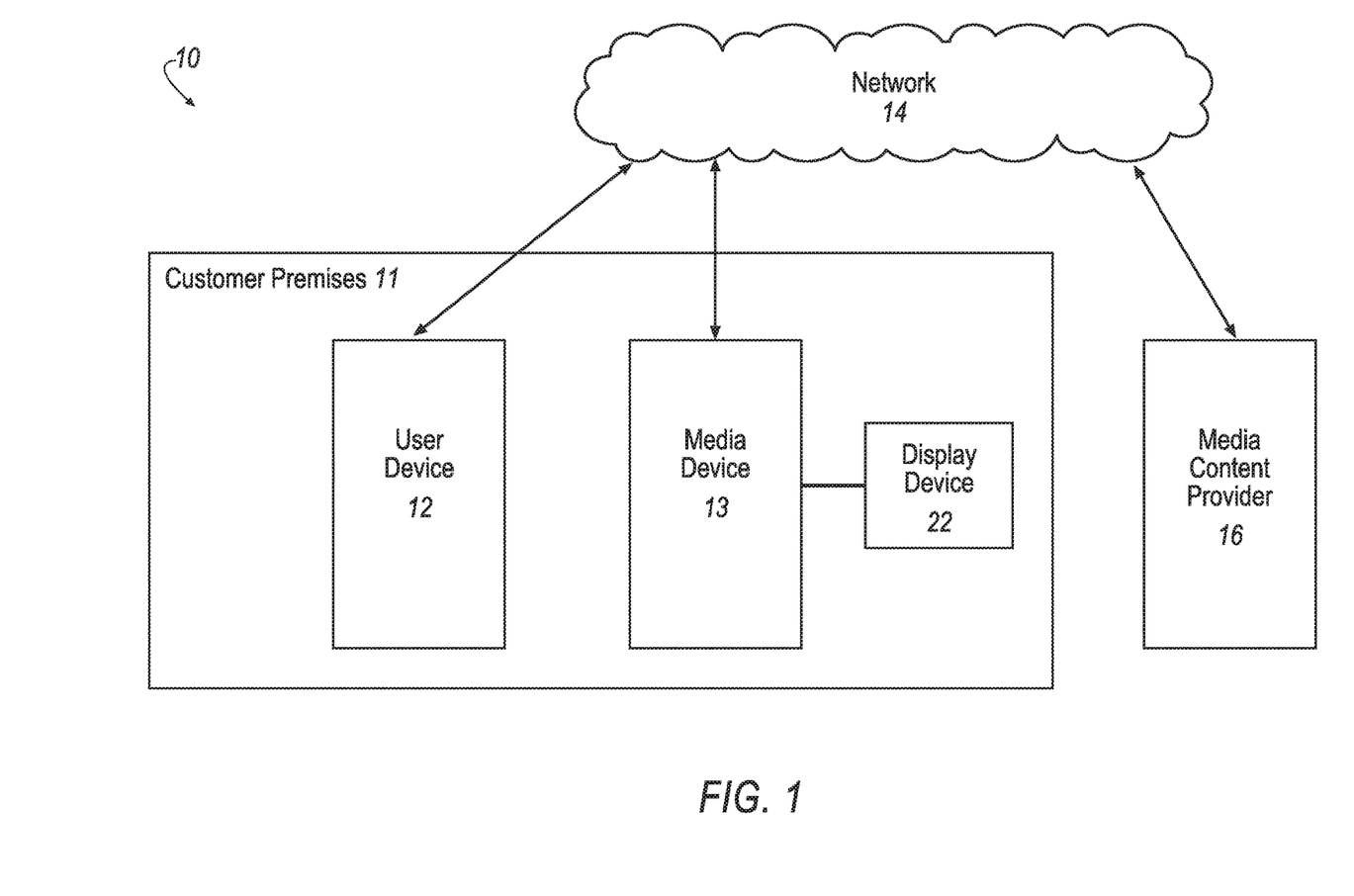
FIG. 1 is a diagram of an exemplary media content provider system.

As shown in FIG. 1, an exemplary media system 10 includes one or more user devices 12, one or more media devices 13, a network 14, and a server 16. The media device 13 may be communicatively coupled to a display device 22. The user device 12, media device 13 and display device 22 may be included in a customer premise 11.

A user is typically a manager of a media group competing within a league. The user may further be a consumer of media content provided by the media system 10.

The user device 12 is typically a known device such as a mobile telephone, tablet, smart wearable (smart watch, fitness band, etc.), other portable computing device, etc. The user device 12 may include one or more applications such as a league competition interface, a video recorder, etc., and one or more data collectors such as a video camera, a microphone, etc. The user device 12 may collect data, e.g., a video or audio recording provided by a user, and provide the collected data to the server 16 computer. The server 16 computer is sometimes referred to as the server 16 herein.

The media device 13 receives and displays media content, and is typically a known device such as a set-top box, a laptop, desktop, tablet computer, game box, etc. The term "media content" as used herein, refers to digital audio and/or video data received in the user device 12 computer and/or in the media device 13. The media content may be received, for example, from the server 16 via the network 14. Further examples of media content are discussed below.

The media device 13 is connected to or could include a display device 22. The display device 22 may be, for example, a television receiver, a monitor, a desktop computer, a laptop computer, a tablet, a mobile telephone, etc. The display device 22 may include one or more displays and one or more speakers for outputting respectively the video and audio portions of media content and advertisement content received from the media device 13.

The network 14 represents one or more mechanisms for providing communications, including the transfer of media content items, between the user device 12, media device 13, and the server 16. Accordingly, the network 14 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) and/or wide area networks (WAN), including the Internet, etc.

The server 16 is typically a known computing device, e.g., such as is included in one or more of a cable or satellite television headend, a video streaming service such as generally includes a multimedia web server (or some other computing device), etc. The server 16 may provide media content, e.g., a movie, television program, documentary, etc. to the user device 12 and/or media device 13.

The media content is typically delivered as compressed audio and/or video data. For example, the data may be formatted according to known standards such as MPEG or H.264. MPEG refers to a set of standards generally promulgated by the International Standards Organization/International Electrical Commission Moving Picture Experts Group (MPEG). H.264 refers to a standard promulgated by the International Telecommunications Union (ITU). Accordingly, by way of example and not limitation, media content may be provided to a media device 13 in a format such as the MPEG-1, MPEG-2 or the H.264/MPEG-4 Advanced Video Coating standards (AVC) (H.264 and MPEG-4 at present being consistent) and HEVC/H.265. As is known, MPEG and H.264 data include metadata, audio, and video components. Further, media content and advertisement content in the media system 10 could alternatively or additionally be provided according to some other standard or standards. For example, media content and advertisement content could be audio data formatted according to standards such as MPEG-2 Audio Layer III (MP3), Advanced Audio Coding (AAC), etc.

Figure 2:
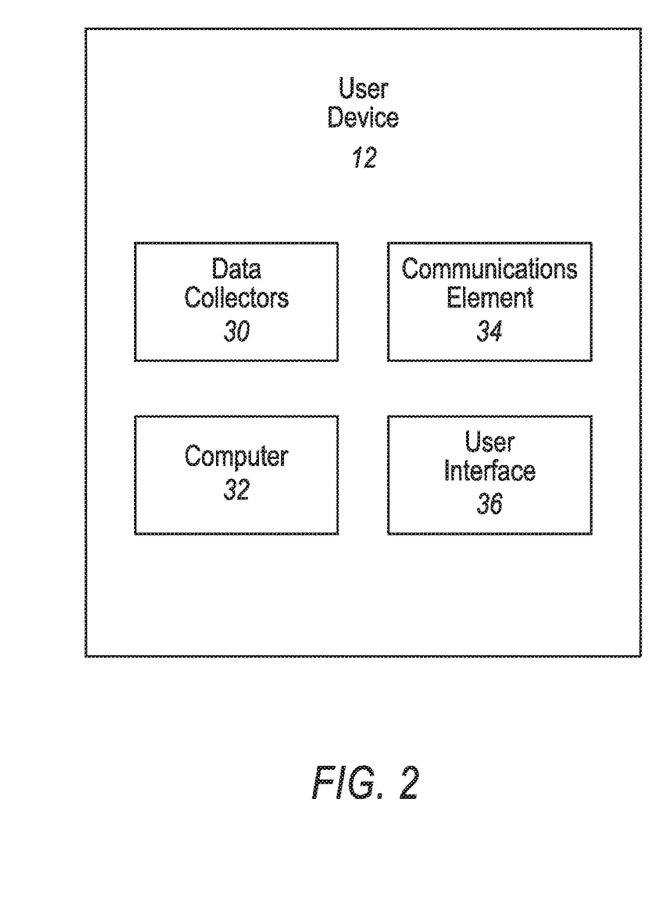
FIG. 2 is a diagram of an exemplary user device for the media system of FIG. 1.

As shown in FIG. 2, the user device 12 includes a computer 32, a communications element 34, and a user interface 36. Additionally, the user device 12 may include and/or be communicatively coupled, e.g., in a known manner, with one or more data collectors 30.

The data collectors 30 may include, for example cameras, microphones, and other types of sensors for collecting data regarding the respective user of the user device 12. The data collectors 30 are communicatively coupled to the computer 32, and may be included in or remote to the user device 12. The data collectors 30 are provided to collect data such as a video or audio recording data from the user and provide the data to the user device 12 computer 32.

The user device 12 communications element 34 may include hardware, software, firmware, etc., such as are known, and may be configured for one or more types of wireless communications. The hardware may include, e.g., one or more transceivers, one or more receivers, one or more transmitters, one or more antennas, one or more microcontrollers, one or more memories, one or more electronic components etc. The software may be stored on a memory, and may include, e.g., one or more encoders, one or more decoders, etc., for converting messages from one communications protocol to another protocol. Some operations, e.g., encoding operations, may be realized via firmware.

Types of wireless communications used in the present context may include cellular communications, Wi-Fi communications, two-way satellite communications (e.g., emergency services), one-way satellite communications (e.g., receiving digital audio radio broadcasts), AM/FM radio, etc.

The user device 12 user interface 36 may include one or more input elements such as buttons, a keyboard, a touchscreen, a microphone, a touchpad etc. for receiving input from a user. The user interface 36 may further include one or more display elements such as an LCD display, speaker, light emitting diodes, buzzers, etc. for outputting data to the user.

The user device 12 computer 32 includes a memory, and one or more processors, the memory storing program code, i.e., computer-executable instructions, executable by the processor. The computer 32 is operable in a known manner to receive input from the user and to transmit the input to another computing device such as the media device 13 and/or the server 16. The computer 32 includes one or more applications such as are known to collect video and/or audio data from the sensors 30 and provide the video and/or audio data to the server 16. Additionally, the user device 12 computer 32 includes one or more applications to allow the user to participate in various aspects of the media group application, such as selecting group members, viewing a group member mosaic, etc., as described below.

Figure 3:
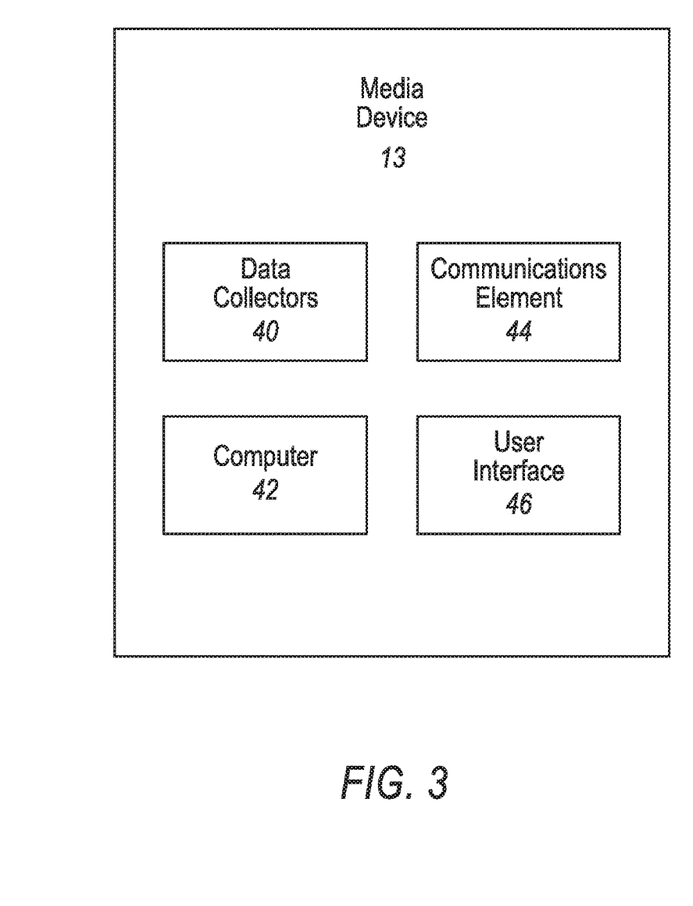
FIG. 3 is a diagram of an exemplary media device for the media system of FIG. 1.

As shown in FIG. 3, the media device 13 includes a computer 42, a communications element 44, and a user interface 46. The media device 13 may further include and/or be communicatively coupled with one or more data collectors 40. The computer 42 is communicatively coupled with each of the data collectors 40, communications element 44 and user interface 46.

The media device 13 data collectors 40 may include, for example cameras, microphones, and other types of sensors for receiving video and/or audio recordings from the user. The data collectors 40 are communicatively coupled to the computer 42, and may be included in and/or remote to the media device 13.

The media device 13 communications element 44 includes hardware, software, and/or firmware, etc., such as are known, and can provide one or more types of wireless communications. The hardware may include, e.g., one or more transceivers, one or more receivers, one or more transmitters, one or more antennas, one or more microcontrollers, one or more memories, one or more electronic components etc. The software may be stored on a memory, and may include, e.g., one or more encoders, one or more decoders, etc., for converting messages from one communications protocol to another protocol. Some operations, e.g., encoding operations, may be realized via firmware, as is known.

Types of wireless communications in the context of the media device 13 may include cellular communications, Wi-Fi communications, two-way satellite communications (e.g., emergency services), one-way satellite communications (e.g., receiving digital audio radio broadcasts), AM/FM radio, etc.

The media device 13 user interface 46 may include one or more input elements such as buttons, a keyboard, a touchscreen, a roller ball, a mouse, a microphone, switches, etc., for receiving input from a user. The user interface 46 may further include one or more display elements such as an LCD display, plasma display, speaker, lamps, light emitting diodes, buzzers, etc., for outputting data to the one or more users.

The media device 13 computer 42 includes a memory, and one or more processors, the memory storing program code, i.e., computer-executable instructions, executable by the processor. The computer 42 is operable to receive media content from the server 16 and display received media content on the display device 22.

The media device 13, independently, or in cooperation with the user device 12, provides an interface to the media group application. For example, the user may record video and/or audio data from users, view an interface displaying images of the potential group members participating in a selection event, receive advertisements for display in the application interface, etc., via the media device 13.

The server 16 is configured to provide media content to the user device 12 and/or media device 13, e.g., in a known manner. The server 16 may include one or more processors and memories as is known, as well as known mechanisms for communicating via the network 14.

The memory of the server 16 can store program code, i.e., computer-executable instructions, executable by the processor. The server 16 is programmed to provide media content to the user device 12 and/or media device 13, via the network 14.

The server 16 includes a communications element. The communications element may include hardware, software, firmware, etc., such as are known, to provide one or more types of wireless communications. The hardware may include, e.g., one or more transceivers, one or more receivers, one or more transmitters, one or more antennas, one or more microcontrollers, one or more memories, one or more electronic components etc. The software may be stored on a memory, and may include, e.g., one or more encoders, one or more decoders, etc., for converting messages from one protocol to another protocol. Some functions, e.g., encoding functions, may be realized via firmware.

The communications element may be programmed to transmit and receive media content, e.g., via satellite and/or wired (cable) communications. Additionally, the communications element may be programmed for wireless communications such as cellular communications and Wi-Fi communications.

As described in additional detail below, the server 16 is programmed to perform tasks related to the operation of the media group application. The tasks include collecting data related to potential group members, registering users and groups associated with users, providing potential group member data to users, conducting a group selection process, collecting data to determine success ratings of group members and associated media content items, assigning scores to the group members based on collected data, determining group scores based on the group member scores, and establishing group rankings within a league based on the group scores.

Generally, groups are organized in leagues. Each league has two or more groups, and each group has one or more group members as players in the group. The groups compete for a period, which may be, for example, a month, a television fall season, a television fall and spring season, etc. Within the period, sub-periods of time, such as weeks, may be defined.

Groups are typically selected by users, although, in some cases, a computing device such as the server 16 may select some or all of the members of a group. The server 16 provides opportunities within the media group application for users to win priority status to select particular potential group members via data, e.g., video and/or audio data submitted by the users. The users submit data files which are evaluated by the server 16. Thereafter, the server 16 may provide the potential group member who was the target of the user-submitted data an opportunity to further evaluate the data submitted by the respective users. The server 16 grants users who generated the user-submitted data with the highest rankings after the evaluation process to "lock" group members into their respective groups.

The server 16 scores groups based on each group's collective success ratings during a period or sub-period. A success rating for a media member is a numerical indicator of the success of a media member during a period of time based on popularity, critical acclaim, revenue generation, social media trending data, etc. A success rating for a group of media member is a score based on the combined success ratings of the media members in the group. The scoring process is discussed in additional detail below, with respect to FIG. 9, block 915.

As described below, the server 16 awards points to each group member based on indications of success which occurred during the period or sub-period, such as recognitions, awards, box-office sales for a media content item related to the group member, ratings of a TV program related to the group member, social media trending data, etc. The server 16 thus computes a success rating for a group.

The server 16 may further provide the opportunity for users to trade group members during a period, for example, prior to the beginning of each sub-period.

At the end of a period or sub-period, the server 16 may award prizes, e.g., to users who built the groups with the greatest entertainment success during the period or sub-period.

Figure 4:
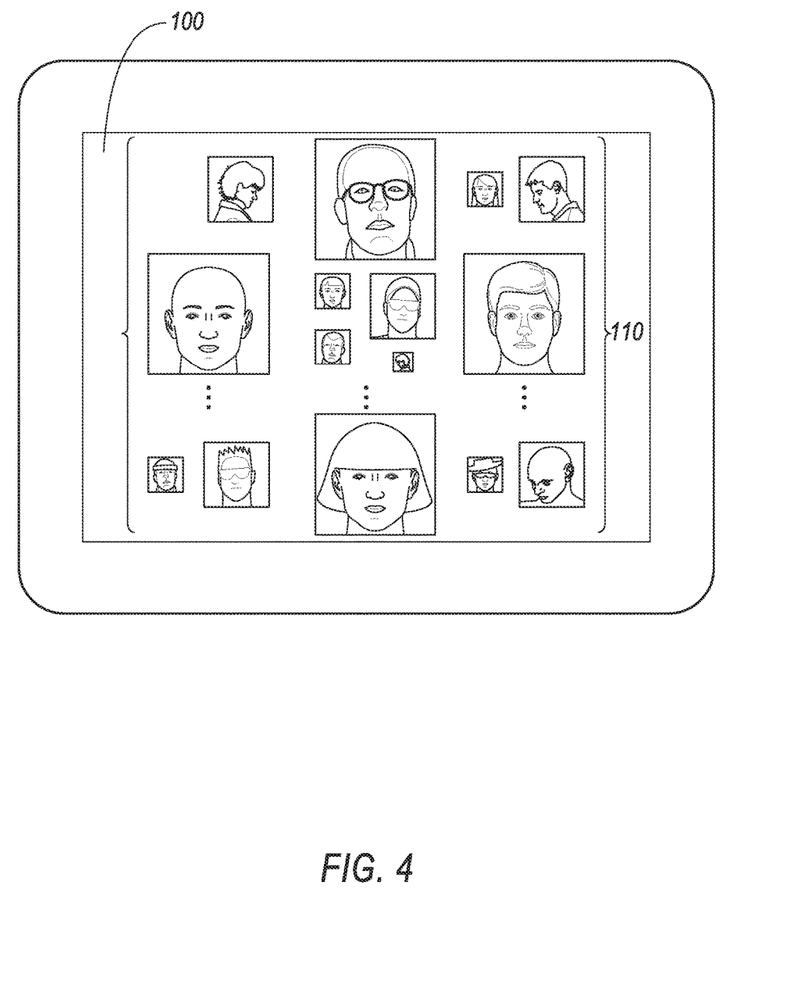
FIG. 4 is a diagram of an exemplary interface for an exemplary media sharing application.

As shown in FIG. 4, during a group selection event, the server 16 may generate and transmit to the user device 12, and/or the media device 13, a group member mosaic 100. The group member mosaic 100 includes a plurality of tiles 110 including images (live or pre-recorded) of group members participating in the group selection event. The tiles 110 may be of varying size. As described below, the server 16 may determine the tile sizes based on data related to the group member presented in the tile 110. The data may include, for example, the number of users (groups) actively competing (by submitting video/audio recordings) for the group member, the number of on-line conversations related to the group member that are detected by the server 16, etc. The size of the tile 110 may further reflect, for example, the amount of sponsorship paid to the media group application provider on behalf of the group member. A studio may choose, e.g., to pay the media group application provider a sponsorship fee in order to promote the group member.

Exemplary Processes

Figure 5:
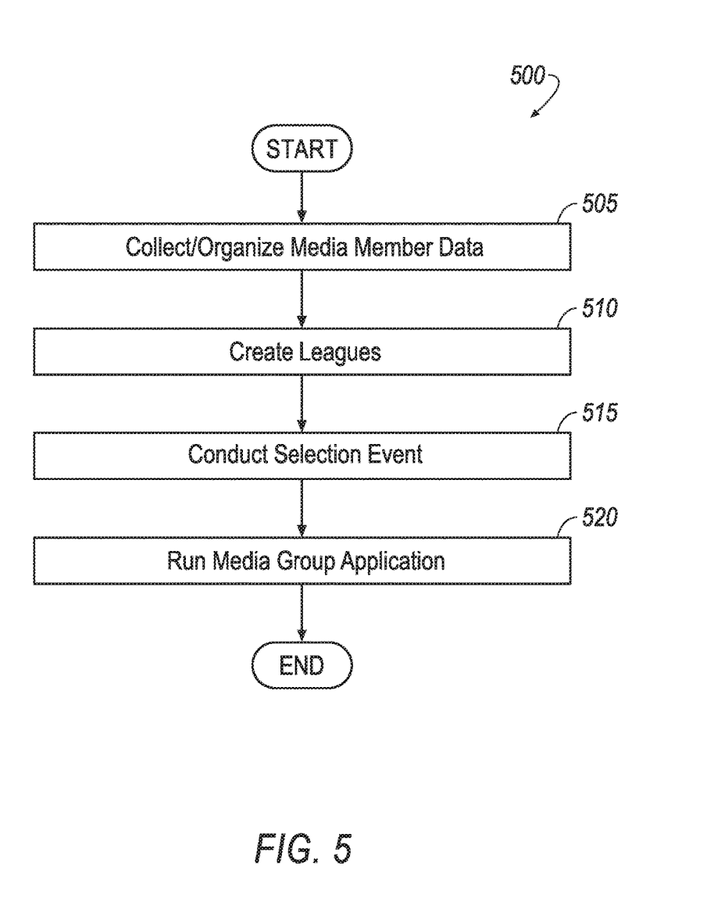
FIG. 5 is a diagram of an exemplary process for the media system of FIG. 1.

FIG. 5 is a diagram of an exemplary process 500 to provide a media group application to users. The process starts in a block 505.

In the block 505, the server 16 collects and organizes data related to potential group members, e.g., as described with respect to an exemplary sub-process 600, below. The process 500 continues in a block 510.

In the block 510, the server 16 creates leagues, e.g., as described with respect to an exemplary sub-process 700 below. Each league includes two or more groups. The process 500 continues in a block 515.

In the block 515, the server 16 conducts a group selection event. During the group selection event, a user, or a computing device such as the server 16, selects potential group members to be included in media groups, e.g., as described below with respect to an exemplary sub-process 800. After the groups are selected, the process 500 continues in a block 520.

In the block 520, the server 16 runs a media group application for a league for a period, as described in the sub-process 900. Upon completion of the media group application period, the process 500 ends.

Figure 6:
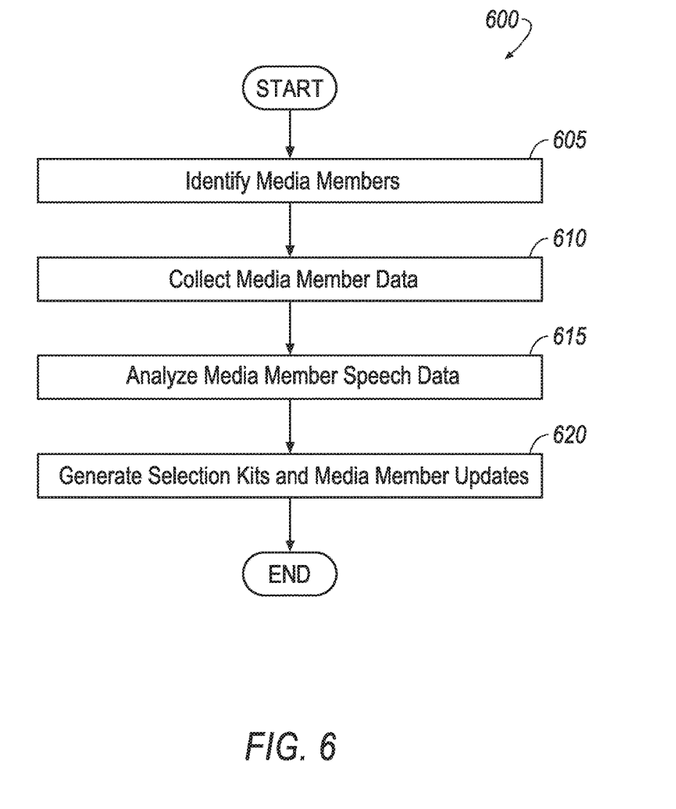
FIG. 6 is a diagram of an exemplary sub-process of the process of FIG. 5 for collecting data.

FIG. 6 is a diagram of an exemplary sub-process 600 for collecting data related to group members. The sub-process 600 begins in a block 605.

In the block 605, the server 16 identifies, and/or receives as input identification of, group members eligible to participate in the media group application. As discussed above, potential group members typically include media content creators and/or participants, such as actors, directors, producers, writers and other TV programming or filmmakers. The potential group members may provide authorization to the media group application provider to include them in the media group application. Generally, the server 16 identifies and includes a sufficient number of potential group members that each group in a league can have a full group, as defined by the league. A group member typically can only be in one group in a league. For example, in a league of 10 groups with 10 group members on each group, the server 16 identifies and/or receives as input the identity of 100 potential group members. Upon identifying and/or receiving as input the identity of the group members eligible to participate in the media group application, the process 600 continues in a block 610.

In the block 610, the server 16 collects data regarding each of the potential group members. The potential group member data includes professional data such as accomplishments (roles in the creation of media content items, awards and recognitions, etc.) and may further include personal data historical data, etc. The data may include little known facts about the potential group member. As described with regard to sub-process 800, the potential group member data will be used to evaluate data submitted by users.

The server 16 may receive/collect data from multiple sources. The potential group member may provide a portion of the data. For example, the potential group member may respond to a questionnaire. Further, the group member may provide recorded input describing an experience in their life such as creating a particular media content item. Additionally, the server 16 may extract data from news sources. For example, the server 16 (or other computing device) may parse data from on-line news stories and blogs. The server 16 may search on-line sources such as on-line libraries, on-line encyclopedias, etc. to gather data related to the media group member.

The server 16 stores and organizes the data in memory. For example, the server 16 may identify a set of keywords, selected from the data which are related to the potential group member such as the names of media content items, romantic partners, co-stars, hobbies, etc. News articles and stories may be accessible by keywords. Upon storing and organizing the data, the sub-process 600 continues in a block 615.

Additionally, the server 16 may receive and analyze data (for examples, digital recordings) of interviews and other conversations conducted with the group member during a predetermined time period prior to the start of a media group application period. The predetermined time period may be defined, for example, as within one month prior to the start of the media group application period.

The server 16 may analyze the data to predict a mental state of the group member at the time of the interview or conversation, as described below. Based on the predicted mental state, the server 16 may predict a success rating the group member will have for a next period of time. The next period of time may be the next month, the fall television season, etc. The period of time may coincide or overlap with a period of competition.

For example, the server 16 may receive a recording of an interview of the group member, discussing the release of a movie to which the group member contributed. The group member may express that she "really enjoyed making the movie", and that the movie was "inspirational" and would "touch many people's lives".

The server 16 can analyze the content of the interview using speech recognition techniques such as are known and can determine that the group member expressed positive comments about the movie. For example, the server 16 may recognize keywords such as "really enjoyed", "inspirational", "touch many people's lives", etc. and determine that the group member was optimistic about the prospects for the movie. The server 16 may further recognize keywords or expressions such as "tough experience", "tension on the set", etc. and recognize that the group member was pessimistic about the prospects of for the movie. Keywords and expressions indicating optimism/pessimism may be, for example, predetermined by the application provider. Relative values may be assigned to the expressions, with high values for positive expressions and low values for negative expressions. The application provider may update a list of the keywords/expressions, together with assigned values, on a regular basis.

In addition, the server 16 analyzes the recording for voice qualities such as tone, volume, voice inflection, pitch, speed, contrast, etc. The server 16 may compare the data to data for the general population, or for a demographic segment thereof, e.g., according to age, gender, etc., of the user. Such comparison, using the general population data as a baseline, can be used to evaluate a mental state of the group member, e.g., a group member may have a positive or negative mental state that could be quantified as a percentage worse or better than the general population. For example, speech with a level of contrast within a particular range may indicate that the user is happy or optimistic. Speech at a speed below a speed threshold may indicate that the user is relaxed. Speech with decreasing volume at the end of phrases may indicate that the group member is discouraged or concerned.

Additionally or alternatively, the server 16 may analyze the voice samples in comparison to one or more baseline samples of the user. For example, the server 16 may request a baseline voice sample from the user when the user is happy and another baseline sample when the user is angry, etc. The server 16 may analyze the current voice samples by comparing the samples to the one or more baseline samples.

The server 16 may analyze the voice quality of the group member during the interview, and together with the content analysis, determine that, for example, the group member is happy and optimistic. Based on this determination, the server 16 may further predict that the movie coming out and involving the group member will be successful. Upon completing the analysis of the group member speech data, the sub-process 600 continues in a block 620.

In the block 620, the server 16 generates group member selection kits, and group member updates. Selection kits may include selected information about potential group members. The selection kits may further include information related to media content items such as current TV programming or recently or soon to be released movies, etc., such as trailers, advertisements, etc. The media group application provider may include additional items such as media content related merchandise in the selection kits.

The media group application provider may make the selection kits available to users of the media group application. For example, the server 16 may transmit the selection kits (or the data portions of the selection kits) to users. As described below, the users may use the data to help them compete for prioritized rights to select particular group members to the users' respective groups. Some information, for example a basic selection kit, may be provided to all users of the media group application. Premium selection kits may contain additional information, and may be provided to the user for a fee.

In addition to generating selection kits, the server 16 may generate updates associated with, e.g., a particular group member. The update may include, e.g., excerpts from recent interviews with the group member, and an analysis of the interview. The analysis may include a prediction of how successful the group member will be in an upcoming time period. The upcoming time period may be defined as the next month, the fall television season, for as long as a current period of the media group application will continue, etc. As described in additional detail below, success for the group member during the time period may be defined as a combination of factors such as awards received during the time period, popularity of media content items associated with the group member during the time period, positive reviews by critics, social media trending data, etc.

As described below, the server 16 may provide the updates to users in the course of the media group application. The user, for a fee, may subscribe to the updates, and adjust the roster of the user's group based on the information contained in the updates.

Upon generating the selection kits and group member updates, the process 600 ends.

Figure 7:
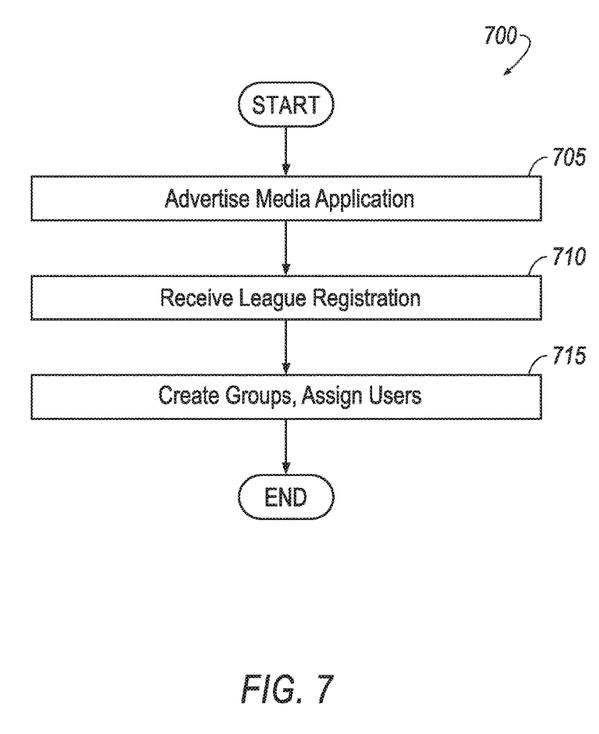
FIG. 7 is a diagram of an exemplary sub-process of the process of FIG. 5 for user registration.

FIG. 7 is a diagram of an exemplary sub-process 700 for registering leagues and groups. The sub-process 700 begins in a block 705.

In the block 705, the media group application provider, for example, via the server 16, advertises the media group application. The server 16 can present advertisements to the user via the media device 13. The server 16 may present the media group application to users, for example, via an interface for selecting media content such as an interface for providing interactive applications, or via an interface to provide on-demand media content to users. The advertisement may provide a link to a registration page for registering a league, a group within a league, etc. The process 700 continues in a block 710. Note that the server 16 may repeat the advertisement from time-to-time, or present the advertisement, for example on an interface, on a substantially continuous basis.

In the block 710, the server 16 receives registrations for leagues and/or groups included in the leagues. For the purposes of this disclosure, a league is a group of two or more groups of group members that compete during a defined period of time. Each league may have a predetermined set of rules for the media group application. The set of rules may include, for example, a period of time for the game, rules concerning the formation of groups such as the number of members on a group, the required types of members on a group (e.g., number of actors, number of directors, number of producers, etc.), trading rules during a period, etc. Upon registering the league, and defining the league rules, the process 700 continues in a block 715.

In the block 715, the server 16, based on the league rules and input from users, creates media group application groups. A media group application group, for the purposes of this disclosure, is a competing entity within a league, having a roster of members. The members can include one or more group members, selected according to the rules of the respective league. Typically, a group may have one or more users who manage the group. As described below, the users may select members to include in the roster. Additionally, during a media group application period, for example, prior to a sub-period, the users may execute trades of group members with other groups.

Upon registering leagues, creating groups within the league, and assigning/connecting users with each group, the process 700 ends.

Figure 8:
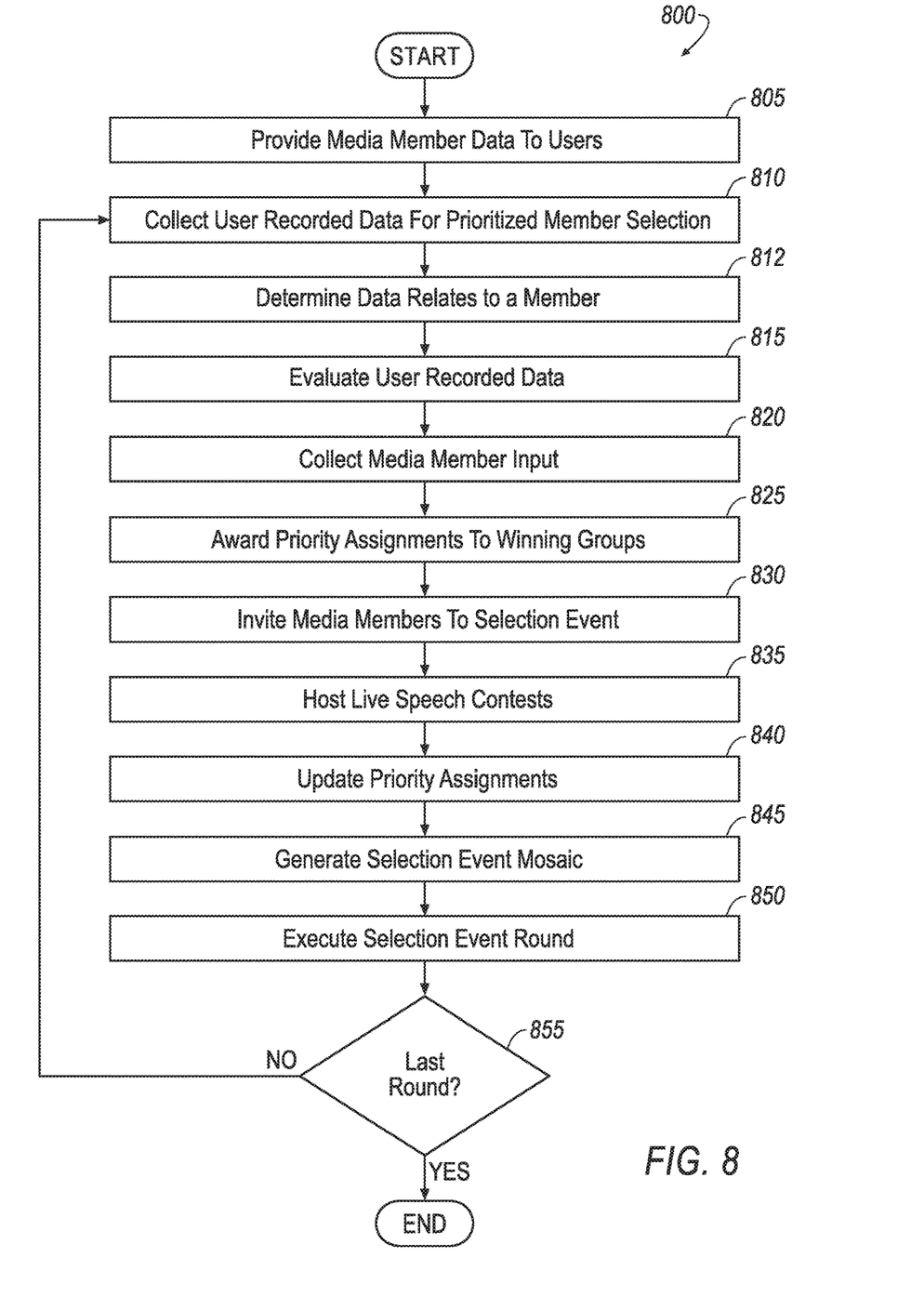
FIG. 8 is a diagram of an exemplary sub-process of the process of FIG. 5 for a media group application setup.

FIG. 8 is a diagram of an exemplary sub-process 800 for selecting groups to compete in the media group application. The process 800 begins in a block 805.

In the block 805, the server 16 provides group member data to users. The server 16 may provide some data, for example, a basic selection kit, to all users prior to the selection event. For example, the server 16 may provide data such as a list of group members eligible for the selection event, the type of the group member (e.g., actor, director, producer, writer, etc.), the entertainment success value of each of the group members during a recent media group application, a list of media content (TV programming, movies) that is currently running and is associated with the group member, etc.

Additionally, for example, on a fee basis, the server 16 may provide additional data, such as a premium selection kit to users. The premium selection kit may include historical professional data, personal data, little known facts, etc., related to group members, which the user may use to compete for priority rights to selection particular group members to the user's group.

Still further, the server 16 may provide, for example, on a subscription basis, group member updates. The group member updates may be analyses of interviews, conversations, etc. with the group member, as described with regard to the sub-process 600. The server 16 may provide these updates at one or more times during the selecting process. For example, the server 16 can provide group member updates to users prior to each round of the selection event. The group member updates may be provided on a fee basis.

Upon distributing data for a next round of the selection event, the process 800 continues in a block 810.

In the block 810, the server 16 collects data from users for prioritized member selection. Each user may record and provide data files to the server 16. The data may include recorded digital (video or audio) data, delivered by the user, and present reasons why the user should be given prioritized rights to select a potential group member to the user's group. The user may display the user's knowledge of the group member by including information related to the group member such as personal stories, recent events, etc., in the user-submitted data. Additionally, the user may display the user's interest in the group member through the words and expressions of the speech, and further through the voice quality of the speech. Upon receiving the data files from the users, the process 800 continues in a block 812.

In the block 812, the server 16 determines that the user-submitted data relates to a user selected from a list of a list of potential group members. For example, the server 16 may receive an input from the user indicating that the user-submitted data relates to a group member selected from the list of potential group members. As another example, the server 16 may identify the name of the potential group member in metadata associated with the user-submitted data, or, using text recognition techniques as are known, recognize the name of the potential group member in the user-submitted data, and/or determine that the text expresses the user's knowledge/interest of the potential group member. Upon determining that the user-submitted data relates to a user selected from the list of potential group members, the process 800 continues in a block 815.

In the block 815, the server 16 evaluates and ranks the user-submitted data from users with regard to each of the group members. As an example, the server 16 can assign a score to each user-submitted data having a value between zero and one-hundred. The score can include a first partial score based on indications of user knowledge included in the user-submitted data and a second partial score based on user interest as indicated by words, expressions and voice quality of the user-submitted data. Each of the first partial score and second partial score may have a numerical value between zero and fifty.

The server 16 may determine the first partial score by matching the content of the users' data with collected group member data, as collected in the sub-process 600. For example, the server 16 may identify keywords in the user's data that match with keywords in the group member data. The server 16 may award a point or points to the user for each matched keyword.

Keywords may have different values, depending, for example, on a level of intimacy (or obscurity) associated with the particular keyword.

For example, the media group application provider may maintain a list of keywords related to the media member and associated values. Commonly known keywords, such as the names of recent media content items associated with the group member may be assigned one point. The name of a small town where the group member lived as a child may be assigned five points. The knowledge that the group member had a broken leg while filming a particular scene of a movie may be assigned ten points. In some cases, group members may assign values to particular keywords, for example in a questionnaire completed by the group member, or together with a story submitted by the group member.

The list of keywords associated with a group member will grow with each interview, piece of content, and questionnaire received by the server 16.

In order to determine the first partial score for a user-submitted data file, the server 16 may, for example, identify all of the keywords in the user's data that match keywords in the list of keywords related to the media member.

The server 16 may determine, based on the list, a value for each keyword. The server 16 may then, for example, take the five keywords with the highest values, and add them together to form the first partial score for the user.

The server 16 may determine a second partial score based on the interest displayed by the user for the group member. The server 16 may calculate the second partial score, for example as an average of a score for "words expressing interest" and a score for "voice quality".

The server 16 may determine a score for "words expressing interest" by identifying words and expressions in the user data, and assigning scores to the words and expressions. The score for "words expressing interest" may be a numerical value representing a level of interest expressed through words and expressions that are included in the user-submitted data. The media group application provider may maintain a table of "words expressing interest" and assign values to each of the "words expressing interest". The scores may be on a scale from zero to fifty. For example, the media group application provider may assign a score of fifty to an indication that the user has seen "every episode (of a TV series) three times" or can "recite the entire movie". The server 16 may assign lessor scores for example, twenty-five points, to expressions such as "is my favorite", or "really funny", etc. The server 16 may, e.g., identify the top five "words expressing interest" and generate an average "words expressing interest" score.

Further, the server 16 may evaluate the voice quality of the user and assign a score. The voice quality score may be a numerical value representing a mental state of the user expressed through characteristics of the user's voice in the user-submitted data. As described above with respect to analyzing interviews of group members (sub-process 600, block 615), the server 16 may determine a mental state of the user when the user recorded to data. The server 16 may quantify a positive or negative mental state of the user as a percentage worse or better than the general population. The server 16 may further normalize the score on a scale of from zero to fifty, with fifty representing a highly positive mental state.

The server 16 may calculate the second partial score to be an average of the "words expressing interest score" and the voice quality score.

The server 16 then calculates the score for the user-submitted data as the sum of the first partial score and the second partial score.

In addition to the first and second partial scores, the score may include a third partial score. The third partial score may include references. The user earns points each time the user references a related piece of content, an media group application activity, related internet activity, a related article, a related interview, etc. In the case that the third partial score is used, the total possible score for each partial score may be adjusted. For example, the range of the first partial score may be from zero to forty, the range of the second partial score may be from zero to forty and the range of the third partial score may be from zero to twenty.

Upon evaluating and computing scores for each user-submitted data, the process 800 continues in a block 820.

In the block 820, the server 16 collects input from group members regarding selected user-submitted data. The server 16 may collect the input from multiple leagues that are participating in a common selection event experience. For each group member, the server 16 may identify a number, e.g., fifteen, user-submitted data files receiving the highest scores, and forward the user-submitted data files to the respective group member. The group member may watch/listen to the user-submitted data files and evaluates them. The group member may adjust the ranking of the user-submitted data files based on the group member's evaluation. For example, user-submitted data files that were ranked below the top ten may be moved into the top ten, and other user-submitted data files ranked in the top ten may be moved down. Upon receiving the updated rankings from the group members, the process 800 continues in a block 825.

In the block 825, the server 16 awards priority assignments to users to select group members to their respective groups. For example, in a particular league four users may have provided data files related to a particular group member. The user who generated the highest ranked user-submitted data within the league may be awarded the prioritized right to select the group member during a particular round of the selection event.

Note that priority assignments may also take place during subsequent rounds of the selection event. For example, following a first round of the selection event, users may compete for priority to select group members who were not selected in a first round of the selection event. Note further that priority assignments may change based on real-time speech competitions between users during a selection event round, as described below.

Upon assigning priorities to users (and their respective groups) based on the data submitted by the users, the process continues in a block 830.

In the block 830, the server 16 invites group members to participate in the selection event based on one or more criteria. For example, studios or producers associated with a group member may purchase an invitation for the group member to participate in the selection event. As a second example, group members who were the subject of at least one user-submitted data may be invited to participate in the selection event.

The group members that were invited to the selection event may actively participate in the selection event. For example, the group member may allow users in a league to contest the priority claim that a particular user in the league has on the group member. The server 16 invites the group member to join the selection event of the league during the round that the user is exercising the user's priority right. Upon inviting the group members to join the selection event experience, the process 800 continues in a block 835.

In the block 835, the group member, via the server 16, can invite one or more users to compete for the right to select the group member. In response to the invitation, one or more users may make speeches in real-time presenting arguments why they should be awarded priority in selecting the group member. The server 16 receives from each of the users, and transmits to the group member, visual and audio data of the user delivering their respective speeches. The group member may, following the live user speeches, select the group that receives the priority right to select the group member. The process 800 continues in a block 840.

In the block 840, the server 16 updates the assignment of priority rights to select particular group members based on the selections made by the group members during the live speech contests. The process 800 continues in a block 845.

In the block 845, the server 16 generates a selection event mosaic, and transmits the selection event mosaic to users participating in the selection event. As discussed above with reference to FIG. 4, the selection event mosaic contains a plurality of tiles, each tile including an image, either recorded or live, of a group member participating in the selection event.

The server 16 adjusts the size of the tile for each group member, based on one or more factors. For example, the server 16 may consider the amount of sponsorship paid by, or on behalf of, the media player in determining the size of the tile. The server 16 may generate a larger tile for a first group member for whom a studio paid a large sponsorship fee, relative to a second group member for whom a smaller (or no) sponsorship fee was paid.

Additionally, the server 16 may be programmed to consider the number of times that the group member is mentioned in user-submitted data, and/or participates in real-time recruitment contests. The server 16 may adjust the size of the tile such that an increased tile size indicates a larger number of mentions of the media player.

Still further, for example, the server 16 may monitor electronic communications associated with the media group application, and adjust the size of a tile representing the group member according to the number of mentions of the group member in the communications.

The server 16 may, for example, collect data substantially continuously, and update the size of the tiles on a regular basis, for example once every minute.

The server 16 may generate the selection event mosaic, and transmit the mosaic to user devices 12 and/or media devices 13 associated with users participating in the selection event. The server 16 may also provide an audio feed associated with the mosaic. As one example, the server 16 may provide audio of the group member with the largest tile. As another example, the server 16 may allow the user to select the audio feed of the user's choice. For example, the user may be able to select a group member, from the mosaic, to whom the user would like to listen. The server 16 may receive the selection, and channel the audio from the selected group member to the user. Upon presenting the video and audio data associated with the selection event mosaic to the users participating in the selection event, the process 800 continues in a block 850.

In the block 850, the server 16 conducts one round of the selection event. The groups that have been awarded priority rights to particular group members are assigned those group members by the server 16. The server 16 receives, according to a predetermined sequence, the selection requests from remaining groups, and assigns the selected group members to the groups. Upon completion of a round of the selection event, the process 800 continues in a block 855.

In the block 855, the server 16 determines whether the last round of the selection event has occurred? In the case that the last round has occurred, the process 800 ends? Otherwise, the process 800 continues in the block 810.

Figure 9:
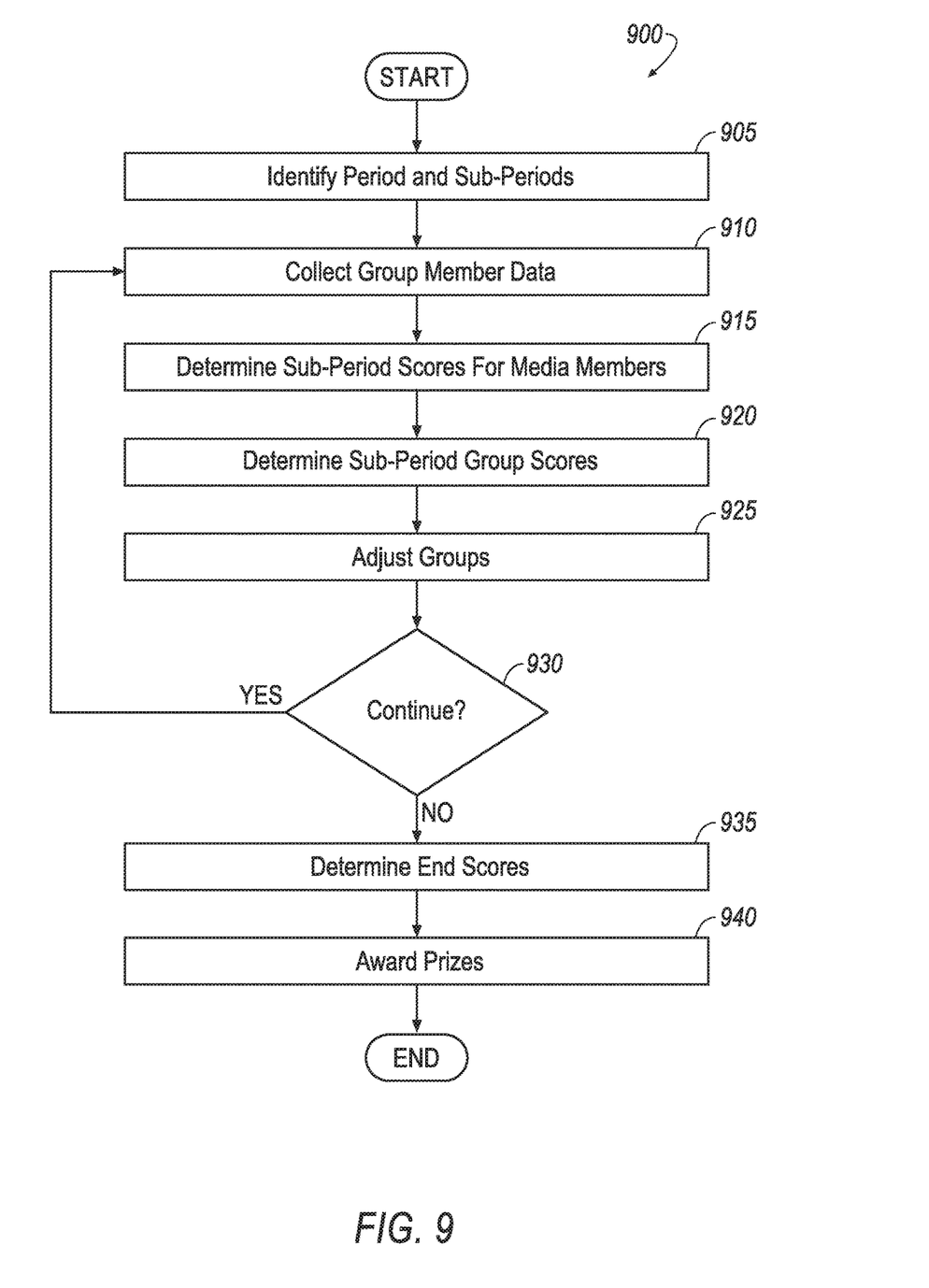
FIG. 9 is a diagram of an exemplary sub-process of the process of FIG. 5 for executing a media group application.

FIG. 9 is a diagram of an exemplary sub-process 900 for executing a period of the media group application. The process 900 begins in a block 905.

In the block 905, the server 16 determines/receives a period and when applicable, sub-periods for the media group application. For example, the server 16 may receive as input from the media group application provider that the media group application starts on September 1 of a given year, and continues for a period of 14 weeks, ending on December 8. The server 16 may further receive input that each week of the period should be considered a sub-period by the server 16. Upon determining the period and sub-periods, the process 900 continues in a block 910.

In the block 910, the server 16 collects group member data. For example, as described above, a number of leagues may be participating in the media group application. The leagues may be structured such that each league requires a maximum of one-hundred group members. For example, a league may have ten groups of ten members each.

The server 16 collects data regarding each of the one-hundred group members for a sub-period (e.g., a week). The data includes reviews of group members by critics, awards and recognitions received by the group members, ratings, box office sales, on-demand revenue and other indicators of the popularity of media content created by or attributed to the group member, social media trending data, popularity of the group member within the media group application (for example, a number of user-submitted data dedicated to the group member). Upon collecting the data, the process 900 continues in a block 915.

In the block 915, the server 16 determines sub-period scores for each member of the group members. The server 16 may, for example, determine three partial scores for each group member. The score for the member may be a sum or average of the three partial scores. A first partial score may be based on critical acclaim of the group member during the sub-period based on reviews from critics, award nominations, awards, and other recognitions received by the group members, and may be determined as described below. A second partial score may be based on popularity of the media content created by, or otherwise attributed to the group member as based on TV programming ratings, box office sales, on-demand revenue, etc. and may be determined as described below. A third partial score may be based on the number of mentions that the group member or media content attributed to the group member, in news media and social media and may be determined as described below.

The first partial score may be a number between zero and one-hundred. The server 16 may generate the first partial score based on reviews from critics, awards, award nominations, and other recognitions received by the group member during the sub-period. The first partial score may be determined as a combination (sum or average) of a quantitative indicator value, a language value, and an award value, as described below.

Initially, the server 16 may be programmed to identify reviews with quantitative indicators such as a number of thumbs up, a number of stars, etc., related to the media member. The server 16 may normalize each of the quantitative indicators to a range of from zero to one-hundred, and then generate a quantitative indicator value. The quantitative indicator value may be determined, for example, as an average of the normalized quantitative values.

Further, the server 16 may be programmed to consider the language of reviews. The server may determine, for example a language value of the review that reflects the positive or negative nature of the review. The language value of the review may be in a range of from zero to one-hundred.

The media group application provider may, for example, maintain a table of keywords including assigned values for each of the keywords. The assigned valued may be in a range from zero to 100. Highly positive keywords such as "outstanding", "gold-standard" etc. may be assigned relatively high values. Neutral or negative keywords such as "satisfactory", "uninspired", "inconsistent", etc. may be assigned lower values. The server 16 may identify keywords in the reviews that match keywords in the list of keywords. Based on the list of keywords, the server 16 may calculate the language value of the review. The language value of the review may be, for example, an average of the assigned value for each of the keywords identified in the review.

Still further, the server 16 may be programmed to identify awards, nominations, and other recognitions received by the group member during the time period. Based on the number and types of awards received by the user, the server 16 may determine an awards value between zero and one-hundred.

The server 16 may assign, based on a first look-up table, a "number of awards" value. For example, the look-up table may assign a value of twenty to receiving one award during the time period, a value of forty to receiving two awards, up to a value of one-hundred for receiving five or more awards.

Additionally, the server 16 may assign, based on a second look-up table, a "type of awards" value. For example, an Academy Award nomination or Golden Globe nomination may be assigned one-hundred points. Lesser known awards may be assigned a smaller number of points. The server 16 may determine the "type of awards" value, for example, as the value of the highest award received during the time period.

The server 16 may then determine the awards value to be an average of the "number of awards: value and the "type of awards" value.

This awards value may also be averaged, together with the quantitative indicator value and the language value to determine the first partial score. In some cases, the server 16 may weigh some of the factors more heavily than other. For example, the server 16 may weigh the awards component of the first partial score more heavily than other components when determining the average of the components. The media group application provider may specify a weighting to be applied to each of the first, second and third partial scores, and/or to the intermediate values used to generate the first, second and third partial scores.

The second partial score may also be a number from zero to one-hundred, and, as described above, may be based on popularity of the media content created by, or otherwise attributed to, the group member as based on TV programming ratings, box office sales, on-demand revenue, etc. during the sub-period. The server 16 may collect TV programming ratings for media content items associated with a group member during the sub-period. The server 16 may normalize each rating to a range of from zero to one-hundred. Similarly, the server 16 may collect data on box-office sales for movies associated with group members and normalize the box office sales for the box-office sales for each movie to a scale of from zero to one-hundred. The server 16 may similarly collect data about on-demand purchases, on-demand rentals, etc. for media content items associated with each group member. In order to determine the second partial score, the server 16 may take an average of the normalized TV programming ratings for each TV program associated with the group member, the box office sales for each movie associated with the group member, and the on-demand sales and/or rentals of media content associated with the group member.

Media content that has been available for longer than a predetermined period of time may be included in the second partial score in a different manner. The predetermined period of time may be, for example two months for films shown in theaters, three months for content available in an on-demand format, etc. For example, the ratings, box office sales, etc. of media content that has been available for longer than the predetermined period of time may be compared on a scale with other media content items that have also been available for longer than the predetermined period of time. The scale may again be normalized to a range of zero to one-hundred so that the scores can be averaged with media content items that have not yet been available for longer periods of time.

The third partial score may also be a number from zero to one-hundred, and as described above, may be based on the number of mentions that the group member or media content attributed to the group member, in news media and social media. For example, the server 16 may search, in the data collected in the block 910, and determine the number of references of each group member and media content associated with the respective group member in the collected data. The server 16 may then rank the group members according to the number of respective references that they received in the collected data. Based on the ranking, the server 16 may assign a normalized score of from zero to one-hundred, with, for example, the group member that received the highest number of references receiving a third partial score of one-hundred, assigning group members with no references in the media a score of zero, and linearly scaling the third partial scores in between.

The server 16 may further take into account a number of mentions or amount of activity related to the group member within the media group application during the sub-period. The server 16 may determine a number of mentions and/or an amount of related to each group member and include these numbers in the calculation of the third partial score as described above.

Alternatively, the server 16 may determine a second component score based on the number of mentions and/or amount of activity related to each group member. The server 16 may then rank the group members according to the number of respective mentions and/or amount of activity. Based on the ranking, the server 16 may assign a normalized value of from zero to one-hundred, with, for example, the group member that received the highest number of mentions and/or amount of activity receiving a component score of one-hundred, assign group members with no mentions or activity a score of zero, and linearly scaling the component score in between.

In this case, the server 16 may calculate the third partial score as, for example, an average of the third partial score based on the number of mentions that the group member or media content attributed to the group member, in news media and social media, and the second component score based on the number of mentions and/or amount of activity related to each group member.

The server 16 may apply different methods and/or evaluations for determining a sub-period score for different types of group members. For example, an award for Cinematography awarded to a media content item may be awarded more points for a Cinematographer, and fewer points for an actor related to the media content item. As another example, the media group application may maintain a separate table of keywords for each type of group member.

The server 16, may then, for example, determine a score for each group member, equal to the sum of the first, second and third partial scores.

Upon determining the scores for each group member for the sub-period, the process 900 continues in a block 920.

In the block 920, the server 16 determines media group scores for the sub-period based on the group member scores. As an example, the group score for the sub-period may be a total of the group member scores during the sub-period for the members on the media group. Upon determining the group scores, the process 900 continues in a block 925.

In the block 925, the server 16 may, when applicable, adjust the group members belonging to the groups. For example, a user/manager of a first group may transmit a request, via the server 16, e.g., using known messaging and/or communications techniques, to the user/manager of a second group to trade a first member of the first group for a second member on the second group. The user/manager of the second group may confirm the requested trade. The server 16, based on the transaction, may transfer the first member from the first group to the second group and the second member from the second group to the first group. More complex trades, involving multiple members, and/or multiple groups, may also be executed.

As another example, an intermediate selection event may occur. As described with respect to the process 800, users may submit, and the server 16 may collect and evaluate user recorded data. Media group members may provide input regarding the user recorded data. The server 16 may invite media members to participate in the intermediate selection event. The server 16 may, upon request from a media member, host real-time contests for priority rights to select the media member for a group. The server 16 may further execute an intermediate selection event round. During the intermediate selection event round, the server 16 may generate and provide for viewing a selection event mosaic.

Upon completing member trades between groups, and/or activities related to an intermediate selection event, the process 900 continues in a block 930.

In the block 930, the server 16 determines whether the process 900 continues. In the case that the period of the media group application has not ended, the process 900 continues in the block 910. In the case that the period of the media group application has ended, the process 900 continues in a block 935.

In the block 935, the server 16 determines the end score for each group. The end score for each group may be the total of the score for the group for each of the sub-periods. Alternatively, for example, sub-periods at the end of the period may be weighted more highly, in order to increase the chances of groups catching up with other groups during the end of the period. Upon determining end scores for each of the media groups, the process 900 continues in a block 940.

In the block 940, the server 16, or the media group application provider, via the server 16, may award prizes to the users of groups that won in their respective leagues. Prizes may include, for example, free on-demand movies, tickets to movie theaters, opportunities to interact with group members, etc. Upon awarding prizes to the users of winning groups, the process 900 ends.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Networked devices such as those discussed herein generally each include instructions executable by one or more networked devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a networked device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
    a computing device including a processor and a memory, the memory storing instructions executable by the processor such that the processor is programmed to:
    determine that respective communications from one or more users relate to a same media participant or creator included in a stored list of media participants and creators, each of the communications including an audio portion;
    determine a first score for each of the communications based at least in part on one or more of tone data, speed data, duration data, and volume data extracted from the respective audio portion;
    allow one of the users, based on a respective first score for the communication from the user, to assign the media participant or creator to whom the communication relates to a group including one or both of media participants and media creators.

2. The system of claim 1, wherein the processor is further programmed to:
    collect data related to one or more of the media participants or creators included in the stored list of media participants and creators;
    identify, in the respective communications from the one or more users, first keywords corresponding to first keywords in the collected data related to the media participants and creators; and
    determine the scores in part based on the correspondence of first keywords in the respective communications from the one or more users to first keywords in the collected data.

3. The system of claim 1, wherein the processor is further programmed to:
    identify, in the respective communications from each of the one or more users, second keywords corresponding to a stored list of second keywords indicating a mental state associated with the communication, and
    determine the scores based at least in part on the correspondence of second keywords in the respective communication from each of the one or more users to second keywords on the stored list of second keywords indicating the mental state associated with the communication.

4. The system of claim 1, wherein the processor is further programmed to:
    rank the communications based on the scores; and
    transmit to the media participant or creator, the communications ranked above a predetermined threshold.

5. The system of claim 4, wherein the processor is further programmed to:
    receive, from the media participant or creator, input regarding the ranking of the communications, and
    adjust the ranking of the communications based on the input.

6. The system of claim 1, wherein the processor is further programmed to:
    authorize a first user associated with a first communication, based at least in part on a score of the first communication, to select the media participant or creator for a first group associated with the first user in a network based media group application.

7. The system of claim 6, wherein the processor is further programmed to:
    identify a league including the first group associated with the first user and at least one second group associated respectively with at least one second user.

8. The system of claim 7, wherein the processor is further programmed to:
    authorize, after authorizing the first user to select the first media participant or creator, the second user to select a second media participant or creator for the second group associated with the second user in the network based media group application, from the stored list of media participants and creators.

9. The system of claim 8, wherein the processor is further programmed to:
    collect, for a predetermined period of time, data related respectively to the first media participant or creator and the second media participant or creator; and
    award points to the first group based on the data related to the first media participant or creator and points to the second group based on data related to the second media participant or creator.

10. The system of claim 1, wherein the processor is further programmed to:
    receive, prior to receiving communications from the users, data including an audio recording from the media participant or creator;
    determine a second score for the audio recording based at least in part on one or more of tone data, speed data, duration data, and volume data extracted from the audio recording;
    provide the second score to the one or more users; and
    receive from the one or more users, the respective communications, wherein, the respective communications are based in part on the second score.

11. The system of claim 1, wherein the processor is further programmed to:
    send, to a second computing device, an interface including one or more images of one or more respective media participants or creators, the one or more media participants or creators selected from the stored list of media participants and creators.

12. The system of claim 11, wherein the processor is further programmed to:
    determine, based on at least one of input from a user and a time, that a selection event is in progress; and
    send the interface including the one or more images to the second computing device based in part on the determination that the selection event is in progress.

13. The system of claim 12, wherein the processor is further programmed to:

receive, during the selection event, one or more communications from users, each of the communications related to at least one of the media participants or creators selected from the stored list of media participants and creators; and determine a size of the image of each respective subject based at least in part on a number of communications received related to the respective media participant or creator.

14. The system of claim 12, wherein the processor is further programmed to:

send, during the selection event, based at least in part on the user first score for the subject, via a third computing device associated with the media participant or creator, an invitation to the subject to participate in the selection event.

15. The system of claim 14, wherein the processor is further programmed to:

receive, from the third computing device, communications data from the media participant or creator; and send, via a fourth computing device, the communication data from the media participant or creator to the allowed user.

16. A method, comprising:

determining, by a computing device, that respective communications from one or more users relate to a same media participant or creator included in a stored list of media participants and creators, each of the communications including an audio portion;

determining a first score for each of the communications based at least in part on one or more of tone data, speed data, duration data, and volume data extracted from the respective audio portion;

allowing one of the users, based on a respective first score for the communication from the user, to assign the media participant or creator to whom the communication relates to a group including one or both of media participants and media creators.

17. The method of claim 16, further comprising:

collect data related to one or more of the media participants or creators included in the stored list of media participants and creators;

identify, in the respective communications from the one or more users, first keywords corresponding to first keywords in the collected data related to the media participants or creators; and determine the scores in part based on the correspondence of first keywords in the respective communications from the one or more users to first keywords in the collected data.

18. The method of claim 16, further comprising:

identify, in the respective communications from each of the one or more users, second keywords corresponding to a stored list of second keywords indicating a mental state associated with the communication, and determine the scores based at least in part on the correspondence of second keywords in the respective communication from each of the one or more users to second keywords on the stored list of second keywords indicating the mental state associated with the communication.

19. The method of claim 16, further comprising:

rank the communications based on the scores; and transmit to the media participant or creator, the communications ranked above a predetermined threshold.

20. The method of claim 19, further comprising:

receive, from the media participant or creator, input regarding the ranking of the communications, and adjust the ranking of the communications based on the input.

* * * * *